March 15, 1966  F. B. DE PODESTA ETAL  3,240,167
RAILWAY CARRIER FOR AUTOMOTIVE VEHICLES
Filed Feb. 27, 1961  5 Sheets-Sheet 1

INVENTORS
FRANK B. DE PODESTA, GILBERT T. INNES
CHARLES M. BURT & DONALD E. KULLGREN
BY
Barnes, Kisselle, Raisch & Choate
ATTORNEYS March 15, 1966   F. B. DE PODESTA ETAL   3,240,167
RAILWAY CARRIER FOR AUTOMOTIVE VEHICLES
Filed Feb. 27, 1961   5 Sheets-Sheet 2

INVENTORS
FRANK B. DEPODESTA, GILBERT T. INNES
CHARLES M. BURT & DONALD E. KULLGREN
BY
Barnes, Kisselle, Raisch & Choate
ATTORNEYS March 15, 1966  F. B. DE PODESTA ETAL  3,240,167
RAILWAY CARRIER FOR AUTOMOTIVE VEHICLES
Filed Feb. 27, 1961  5 Sheets-Sheet 5

INVENTORS
FRANK B. DEPODESTA, GILBERT T. INNES
CHARLES M. BURT & DONALD E. KULLGREN
BY
Barnes, Kisselle, Raisch & Choate
ATTORNEYS United States Patent Office
3,240,167
Patented Mar. 15, 1966

1

3,240,167
RAILWAY CARRIER FOR AUTOMOTIVE
VEHICLES
Frank B. De Podesta, Farmington, Gilbert T. Innes, Dearborn, Charles M. Burt, Detroit, and Donald E. Kullgren, Livonia, Mich., assignors to Paragon Bridge & Steel Company, Novi, Mich., a corporation of Michigan
Filed Feb. 27, 1961, Ser. No. 91,879
9 Claims. (Cl. 105—368)

This invention relates generally to transportation of vehicles by rail, and more particularly to a multi-level superstructure adapted to be mounted on a standard railway flat car to convert the same for efficient loading and transporting of both standard size and compact type automotive vehicles.

In order to compete more successfully with highway transportation of automotive vehicles the railroads have long sought a practical railroad car capable of economically accommodating more vehicles than are presently transportable on a highway haulaway trailer. The development of extra-length flat cars for piggy-back transport of semi-trailers has demonstrated that the railroads can compete favorably with the trucking industry when proper equipment is provided. However, even the extra-length, truck piggy-back flat car can only accommodate four standard size or five or six compact automobiles of contemporary American manufacture. Although several types of specially constructed multi-level automobile freight cars have been proposed as a solution to this problem, such prior art railway cars often are not economically feasible due to high construction, maintenance and/or operation costs, or because of other reasons inherent in the structure thereof.

Accordingly, it is an object of the present invention to provide a multi-level automobile carrier adapted for detachable mounting on a railway flat car and which can be rapidly loaded and unloaded with a competitive quantity of automobiles.

Another object is to provide a multi-level automobile carrier wherein the overall height is reducible to a minimum so as to lower the center of gravity of the carrier and to insure proper clearance for railroad bridges, tunnels and the like.

A still further object of the present invention is to provide an improved shock absorbent mounting of a muti-level automobile transport on the deck of a railway flat car.

Yet another object is to provide a relatively low cost and lightweight multi-level superstructure which is capable of safely and securely supporting a plurality of automotive vehicles on a railway flat car even when subjected to the high impact stresses encountered in railroad coupling and humping operations.

A further object is to provide an improved bridge construction for quick interconnection between adjacent ends of railway automobile carriers adapted to be coupled in tandem relation for circus loading.

Still another object is to provide an improved collapsible hand rail construction for the upper deck of the railway automobile carrier which is economical to manufacture and operate.

Figure 1:
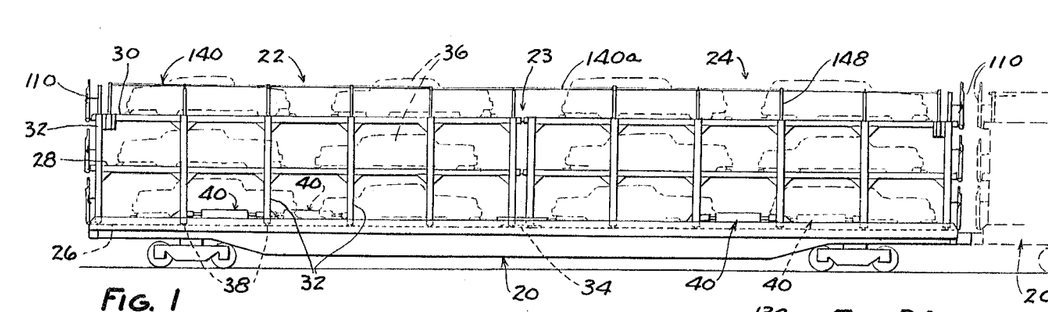
FIG. 1 is an elevational side view of a railroad flat car having two tandem sections of a tri-level automobile carrier superstructure constructed and detachably shock mounted thereon in accordance with the present invention.

Referring to FIG. 1, a conventional extra-length, truck piggy-back railroad flat car 20 is shown provided with two substantially identical sections 22 and 24 of a tri-level vehicle loading superstructure constructed in accordance with the present invention, sections 22 and 24 being shock mounted in tandem relation on the bed of the flat car to provide a convertible automobile loader railroad car. Each of the superstructure sections 22, 24 generally comprises a bottom deck 26, a middle deck 28 and top deck 30 which extend longitudinally of flat car 20 and are supported in vertically spaced relation by a series of longitudinally spaced vertical side columns 32. The adjacent ends of the two superstructure sections 22, 24 are connected at the bottom level thereof by a flexible linking plate 34, and suitable wheel track plates are provided (FIGURE 8) for slidably bridging the gap between the decks of the two sections so that automobiles 36, trucks or other motor vehicles may be driven from one section to another lengthwise of the railroad car. The superstructure rests on rollers 38 one of which is journalled in the bottom of each of the vertical columns 32 so that the entire tri-level superstructure is free to move endwise relative to flat car 20. Four shock absorbing structures 40 are connected between the superstructure and the flat car to absorb, limit and dampen such endwise movement. Each superstructure section 22, 24 is provided with two shock absorbing structures 40 arranged in staggered relation longitudinally thereof, one on each side of the flat car, so that one side of each of the vehicles parked on the bottom deck 26 is always accessible for entrance to and exit from the vehicle. Each section 22, 24 of the superstructure is removable as a unit from the flat car by means of a crane after the shock absorbing structures 40 are disconnected therefrom.

The details of the vertical columns 32 are best seen in FIGS. 2–5 and 7. In accordance with one feature of the invention, each column 32 is a one-piece beam which is preferably pressed from flat sheet stock into a cross-sectional configuration known as a "hat section" (FIG. 4) comprising a center section 42, a pair of parallel side sections 44 which extend perpendicular to center section 42 and a pair of coplanar rim or flange sections 46 disposed parallel to center section 42. Columns 32 have a bowed portion 48 at the bottom thereof formed in the shape of an S-curve (FIG. 7) to provide a wide beamed superstructure adapted to be mounted on the narrower beamed flat car 20.

Figure 2:
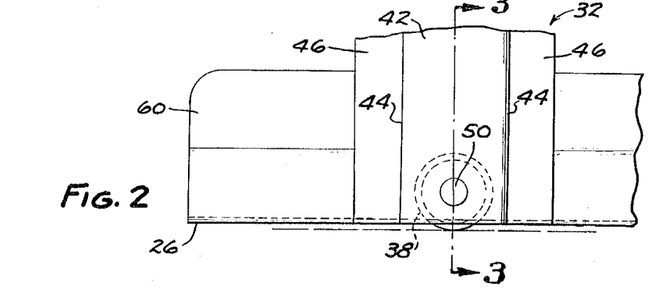
FIG. 2 is an enlarged fragmentary elevational view of the bottom of one of the vertical columns of the superstructure illustrating the mounting of a roller therein.
Figure 3:
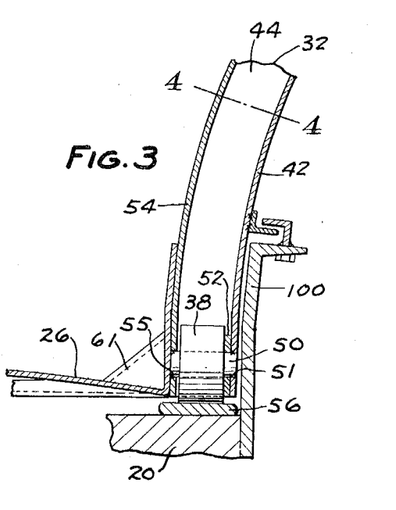
FIG. 3 is a longitudinal sectional view taken on the line 3—3 of FIG. 2.
Figure 4:
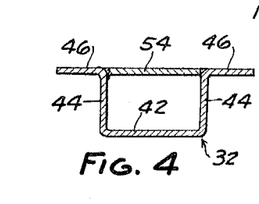
FIG. 4 is a top cross-sectional view taken on the line 4—4 of FIG. 3.

As shown in FIGS. 2–4, a roller 38 is journalled on an axle 50 mounted in the bottom end of each vertical column 32. The outer end of axle 50 is supported in an axle bore 51 punched in center section 42 of column 32 and by a reinforcing spacer washer 52 welded to the inner side of center section 42 co-axial with the axle bore. In order to support the inner end of axle 50 a filler plate 54, pressed to conform to the shape of the bowed portion 48 of column 32, is welded between the inner edges of column flanges 46 so as to provide an enclosed box section in the bowed portion of column 32. The inner end of axle 50 is welded to the inner surface of an axle bore 55 located in filler plate 54 co-axial with bore 51, axle bores 51, 55 being located so that the periphery of roller 38 extends below the bottom edge of the column for rolling engagement with a wear roller plate 56 suitably secured to the bed of flat car 20 adjacent the outer edges thereof. The upper end of filler plate 54 is bent outwardly to form a tab 58 (FIGS. 5 and 7) which serves as a cover to prevent dirt or foreign objects from falling downwardly on roller 38. Filler plate 54 also serves to strengthen the bowed portion of column 32.

Figure 7:
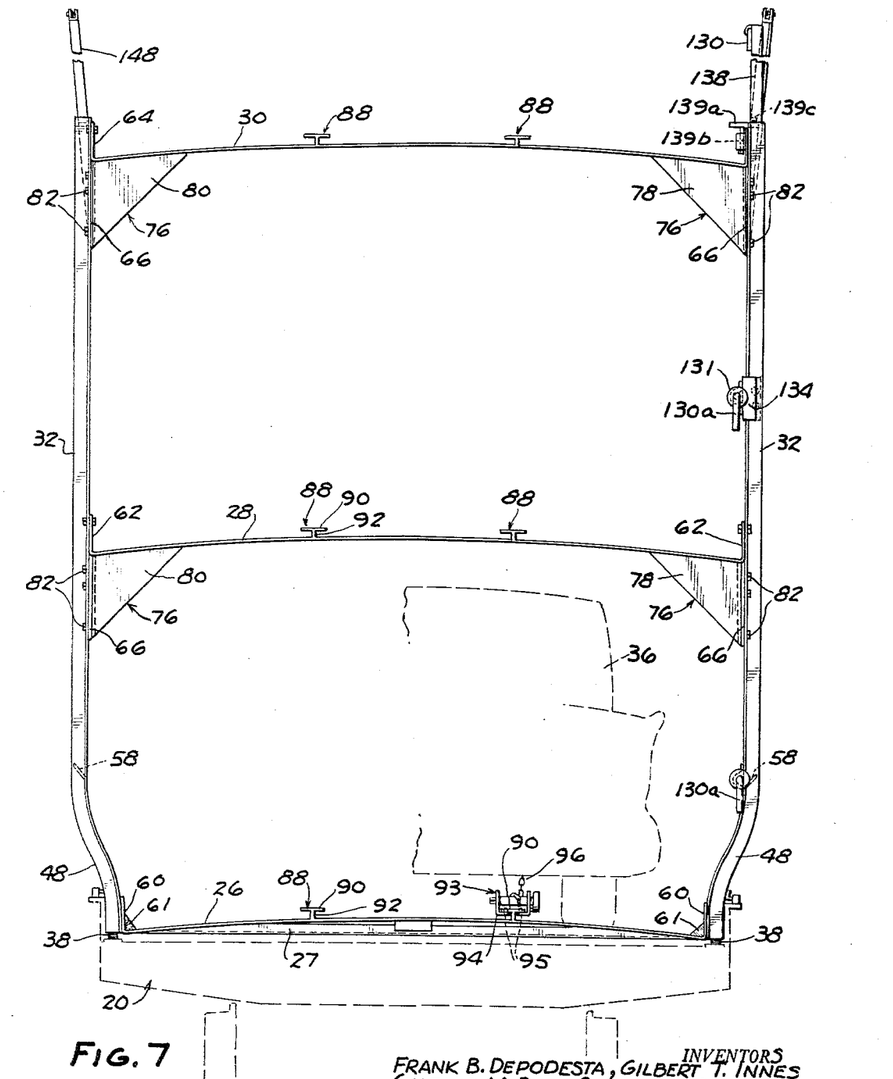
FIG. 7 is an enlarged end elevational view of the tri-level superstructure mounted on the flat car.

In accordance with another feature of the invention, the bottom, middle and top decks 26, 28 and 30 are each made from a single piece of sheet metal, preferably $\frac{3}{16}$ of an inch thick A7 or higher strength steel, and are formed by a rolling process so as to be arched upwardly in an arc of uniform radius to form a crowned deck (FIG. 7). After the rolling operation the outer longitudinal edges of deck plates 26, 28 and 30 are bent upwardly to form integral vertical flanges 60, 62 and 64 respectively, these flanges serving to longitudinally stiffen and strengthen the deck plates as well as providing outer curbing for each deck. Each of decks 26, 28 and 30 is independently supported by the vertical columns 32 at the proper elevation to provide sufficient vertical clearance between the decks to permit passenger vehicles to be driven lengthwise thereon from one end of the railroad car to the other end thereof. Bottom deck 26 is affixed in position spaced slightly above the bed of flat car 20 by welding side flanges 60 of the deck to column flanges 46. Flange 60 is bowed or bent outwardly to conform with the bow in the column flanges 46 at the point of attachment. A small right angle U-gusset 61 is welded in the gutters of bottom deck 26 adjacent each column 32 to stiffen side flanges 60 and hence columns 32 against lateral flexing at the bottoms thereof. The middle and upper decks 28 and 30 are detachably secured to columns 32 by gusset structures which are permanently secured to these decks, and by bolting flanges 62, 64 to columns 32.

Figures 5, 6:
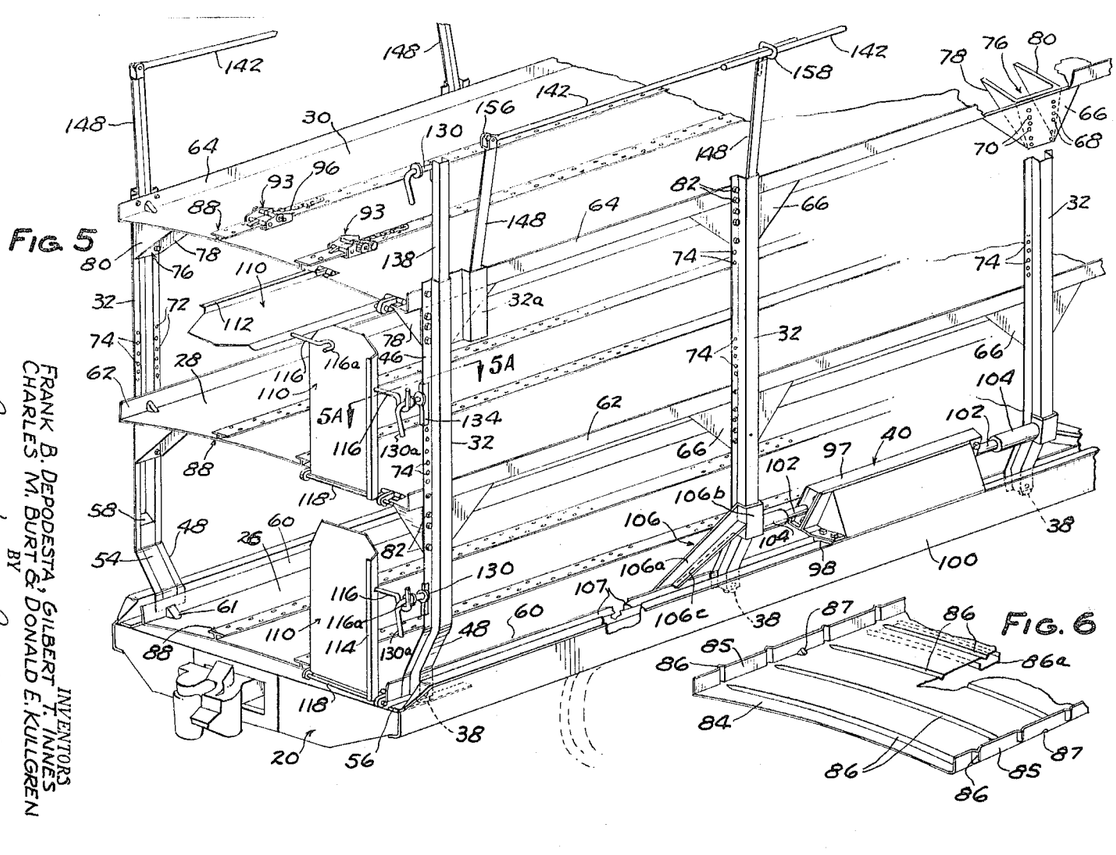
FIG. 5 is a fragmentary perspective view of one end of the automobile carrier superstructure with the top of one column thereof broken away to illustrate gusset details.
FIG. 6 is a fragmentary perspective view of a modified form of deck plate.
Figure 8:
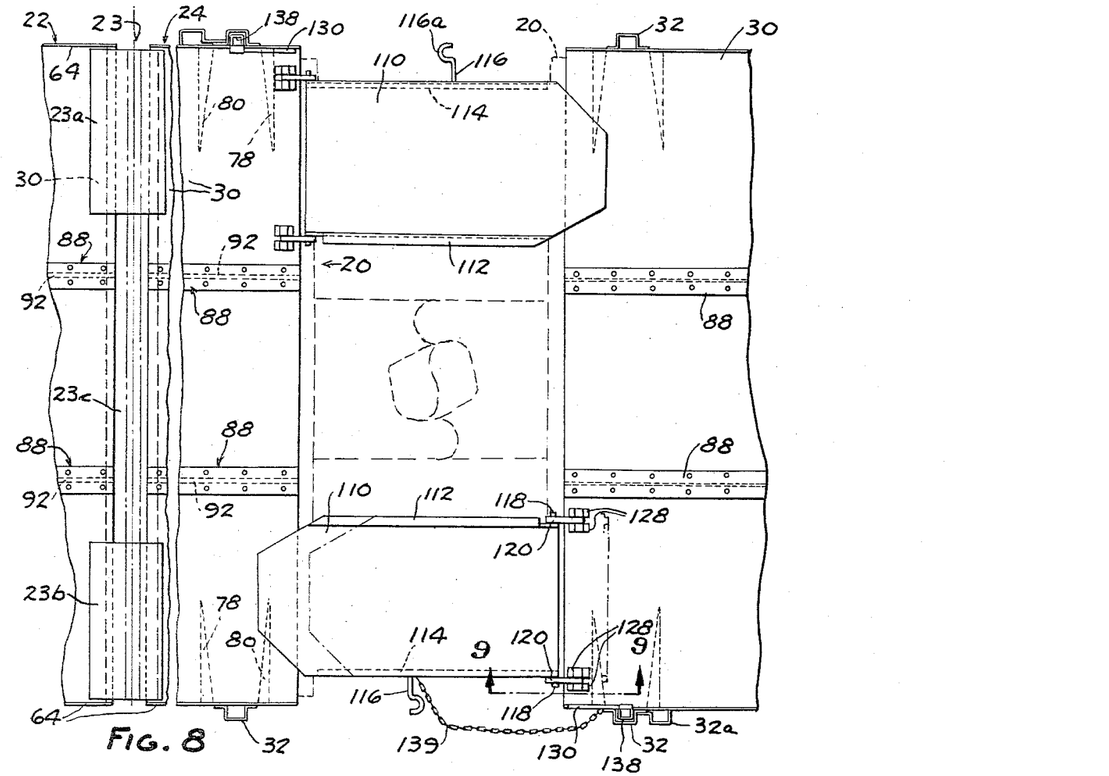
FIG. 8 is a fragmentary top plan view illustrating the gangplank structure for bridging between the same deck levels of two automobile loading superstructures mounted on separate flat cars.

Referring to FIGS. 5, 7 and 8, the gusset structure of the invention includes a longitudinal gusset 66 comprising a trapezoidal plate mounted in an inverted position with the longer base edge thereof welded to the outer bottom edge of deck plates 28 and 30 so that plate 66 extends vertically downward therefrom. Two vertical rows of holes 68 and 70 are punched or drilled through plate 66 for alignment with similar rows of holes 72 and 74 provided in column flanges 46. The gusset structure also includes a U-section lateral gusset 76 which is pressed from a flat trapezoidal plate into a U-shape so that the triangular portions thereof provide a pair of inwardly extending lateral bracing arms 78 and 80. The triangular arm portions 78 and 80 are preferably bent from the center section of gusset 76 along bending lines which diverge upwardly from the apexes of the short base edge of the trapezoid so that the upper edges of arms 78 and 80 slope upwardly to conform to the arch of the deck plate, gusset 76 being welded along these edges to the undersurface of the deck plate. The lateral bracing arms 78 and 80 extend inwardly to a point approximately beneath the position of the wheels of the automotive vehicles carried on the decks. The center section of gusset 76 is provided with two vertical rows of holes which register with holes 68 and 70 in longitudinal gusset 66. A pair of gussets 66, 76 are secured to the decks adjacent each of vertical columns 32, and suitable anchor bolts 82 are inserted through the column holes 72, 74 and gusset holes 68, 70 so as to detachably connect the decks to the columns. Slightly modified gusset structures are employed for connecting the ends of decks 28, 30 to those vertical columns 32 located at each end of superstructure sections 22, 24, one of the triangular portions of gusset plate 66 being cut off to provide a surface which is flush with the outer vertical edge of such columns (FIG. 5).

A modified form of deck plate 84 is shown in FIG. 6 which is identical to deck plates 26, 28 and 30 except for the provision of a series of laterally extending and longitudinally spaced transverse ribs 86 which are integrally formed in the arched floor of the deck. Ribs 86 are pressed downwardly from the upperside of the deck at longitudinally spaced intervals of approximately 3½ inches prior to rolling the arch into the deck. Several ribs 86 may be pressed simultaneously with a drawing die to provide drawn ribs which add stiffness and strength to the arched lateral span of the deck without substantially increasing the weight of the deck. After the deck plate is corrugated and arched, a pair of ribbed side flanges 85 are formed by bending the side edges of the deck to an upright position. Longitudinally spaced holes 87 may be punched along the flange bending lines to provide drainage outlets for the deck, the crowned and corrugated form of deck preferably being used for middle and top decks 28 and 30 where it also serves as a roof to prevent water and grease from dripping on the vehicles located therebelow.

The solid arched deck plates provide a strong bracing for the superstructure with a minimum loss of vertical clearance between the decks, thereby reducing the overall height of the superstructure. Since unused space is available below the arched bottom deck 26, a smooth, uncorrugated deck plate is used which is braced at longitudinally spaced intervals by angle irons 27 welded to the underside thereof along cutaway portions of the vertical flanges of the angle irons (FIG. 7), braces 27 also serving to tie the bottom ends of laterally opposite columns 32 together. With respect to middle and top decks 28 and 30, the lateral U-shaped gussets 76 carry part of the vertical load and help maintain the arched condition of the decks when loaded with vehicles. Longitudinal gussets 66 also help carry the vertical load while longitudinally bracing the superstructure and reinforcing the side flanges 62 and 64 of the decks against bending stresses. Additional bracing may be provided for heavy weight vehicles, such as X-bracings in the form of two intersecting angle irons welded between columns 32 at the shock absorber bays, as well as U-section arched cross beams 86a (FIG. 6) welded to the undersurfaces of decks 28 and 30 so as to extend between laterally opposite columns. By locating the upper edges of the U-section beam between ribs 86, there is a minimum loss of vertical clearance between the decks.

The tri-level superstructure sections 22, 24 are convertible to a bi-level superstructure by unbolting upper deck 30 and removing the same from between the columns, and then unbolting middle deck 28 and shifting it upwardly so that the gusset bolt holes 68, 70 register with the uppermost column holes 72, 74 in the middle series thereof in columns 32. Middle deck 28 then becomes the top deck and is sufficiently spaced from bottom deck 26 to accommodate automotive vehicles such as panel trucks and trailer tractors having greater overall height than that of passenger vehicles.

The one piece decks 26, 28 and 30 are further stiffened and strengthened against longitudinal bowing by T-section beams 88 which are mounted in pairs lengthwise on the upper surface of each deck with one beam adjacent the inner edge of each wheel track (FIGS. 5, 7 and 8). Beams 88 are preferably fabricated by cutting a wide flanged H-section beam longitudinally in half to form two T-beams each comprising a horizontal plate 90 and a vertical web piece 92 which are integrally joined together. The beams are affixed to the decks by welding the bottom edge of web 92 to the flat portions of the upper surface of the deck plate. The horizontal cross plate 90 of T-beams 88 slidably receives a plurality of holddown windlass mechanisms 93 having flange portions 94 which underlie the undersides of horizontal web 90 (FIG. 7), flange portions 94 carrying vertical studs 95 which extend upwardly therefrom into perforations provided in horizontal cross web 90 of the beam (FIG. 8). Each holddown mechanism 93 includes a chain 96 adapted for connection to the underframes of automotive vehicles 36 in a known manner, four holddown mechanisms being used to anchor each vehicle. Thus T-beams 88 serve as reinforcements for the deck plates and as anchoring elements for the holddown mechanisms 93.

Referring to FIG. 5, the shock absorbing structures 40 which connect each superstructure section 22, 24 to flat car 20 comprise a rectangular housing 97 which is bolted to a bracket 98 secured to the side plates 100 of flat car 20. Housing 97 contains a series of alternating rubber and steel plates arranged in a known manner therein and therefore not shown, these plates being coupled internally of housing 97 to a pair of plungers 102 which extend axially outward through the opposite ends of housing 97. Each plunger 102 is received in the co-axial bore of a sleeve 104, each sleeve 104 being welded at the outer end thereof to a gusset bracket 106 welded on the outer sides of each of a pair of longitudinally adjacent columns 32. Bracket 106 comprises a flat plate which is formed into a bracing arm 106a with a vertical U-section 106b at the upper end thereof shaped to embrace column 32, and a bracing strut 106c welded perpendicular to the face of arm 106a. The lower ends of arms 106a and strut 106c are respectively welded to deck side flange 60 and to an angle iron intercolumn brace 107 also welded on flange 60.

As the superstructure sections 22 and 24 move together endwise of flat car 20 on rollers 28, plungers 102 reciprocate axially relative to housing 97, the cushioning plates therein resiliently urging the plungers to a balanced position wherein columns 32 are equally spaced from housing 97. Shock absorbing structures 40 thus serve to cushion the endwise impact stresses encountered in railroad humping and coupling operations so that the vehicles loaded on the superstructure decks are not subjected to the severe jolting experienced by flat car 20. When it is desired to convert the automobile railway carrier back to a standard flat car, housing 97 is unbolted from bracket 98 and the superstructure sections 22 and 24 disconnected from each other. Then sections 22 and 24 are individually removed from the flat car by means of a crane or other hoisting apparatus, the shock absorbing structures 40 being removed intact with the sections.

Referring to FIG. 8, the gap indicated at 23 between the decks of superstructure sections 22 and 24 is covered by bridging plates 23a and 23b which are welded to the upper surface of deck 30 of section 22. The outer ends of plates 23a and 23b abut against the inner sides of deck side flanges 64 of superstructure section 24, thereby preventing lateral shifting of sections 22, 24 relative to one another. A cover plate 23c laterally spans the entire gap between the sides of the deck, one side of the upper surface of plates 23c being welded to the undersides of decks 28 and 30 of section 22 so that the other side of plate 23c overlaps the undersides of decks 28 and 30 of section 24 to provide protection against drippage and to keep holddown chains from dangling in the gap. However, plates 23a, 23b, 23c are free to slide longitudinally on decks 28, 30 of section 24 so that sections 22, 24 can flex longitudinally relative to one another about the axis of the flexible connection therebetween provided by coupling 34 at the bottom of the sections.

In order to facilitate circus loading of the above multilevel superstructure, each of decks 26, 28 and 30 are provided with a hinged gangplank 110 at diagonally opposite corners of the deck (FIGS. 1, 5 and 8). This staggered arrangement of gangplanks 110 permits symmetrical coupling of flat car 20 with similarly equipped cars without regard to the relative direction of the cars. Each gangplank 110 is of sufficient length to bridge the distance between the adjacent coupled ends of the respective railroad cars 20, and is pivotably mounted at one end by an improved hinging structure for double jointed movement.

As shown in FIG. 8, each gangplank 110 comprises a sheet metal plate having integral L-shaped flanges 112 and 114 extending respectively along the inner and outer side edges thereof which serve to reinforce the gangplank against bending stresses. In the horizontal, lowered position of gangplanks 110, flange 112 extends above the upper surface of the gangplank to provide an inner curbing to prevent vehicles from running off the side edges of the gangplank, while the outer flanges 114 extend downwardly from the plane of the gangplank and serve as a support for a combination handle and latch bar 116 extending outwardly therefrom parallel to the plane of gangplank 110.

Figure 9:
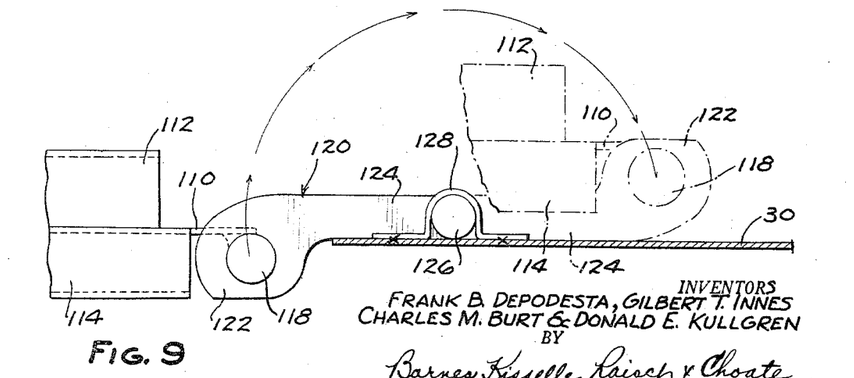
FIG. 9 is a side cross-sectional view taken on the line 9—9 of FIG. 8 but enlarged therefrom to illustrate the hinge structure of the gangplanks.

A rod 118 is welded to the bottom edge of gangplank 110 which extends beyond the opposite side edges thereof to provide pivot pins for rotatably receiving a hinge link 120 on each end of the rod. Hinge link 120 is a one piece casting which includes respectively an eye portion 122 (FIG. 9) provided with a bore adapted to rotatably receive rod 118, an arm 124 extending tangentially from the periphery of eye portion 122 and a cross arm 126 at the end of arm 124 extending parallel with the axis of the bore in eye portion 122. Cross arm 126 of hinge link 120 is journalled on deck plates 26, 28, 30 by a pair of inverted U-straps 128 which are spot welded to the upper surfaces of the decks. Straps 128 are positioned inwardly of the lateral end edge of the decks so that eye portion 122 of link 120 is disposed outwardly beyond such edge when link 120 is in the horizontal position indicated in solid lines in FIGS. 8 and 9. In this position, the supporting surface of gangplank 110 is flush with the deck for bridging between the adjacent ends of decks located at the same level in the respective superstructures of the end coupled railroad cars.

Figure 5A:
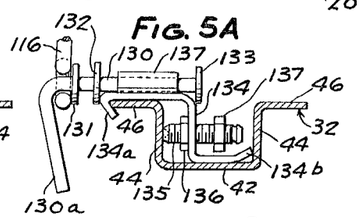
FIG. 5A is a top cross-sectional view taken on the line 5A—5A of FIG. 5 illustrating an adjustable column clamp for a gangplank latch.

After the superstructures are loaded with vehicles, gangplanks 110 are raised from the lowered position by being pivoted upwardly about the axis of shaft 118 to a raised vertical position as illustrated in FIG. 5 with respect to the gangplanks provided for the bottom and middle decks 26 and 28. In this vertical position gangplanks 110 serve as tailgates for each deck, the gangplanks being held in position by locking handle 116 with a latch bar 130 horizontally journalled on end columns 32. Latch bar 130 is provided with a pair of axially spaced apart washers 131 and 132 welded on the horizontal portion thereof, and the outer ends 130a of bar 130 is bent back at an acute angle to the horizontal portion thereof so as to terminate in the plane of outer washer 131 (FIG. 5A).

To lock the gangplank in the upright position thereof, latch bar 130 is rotated until arm 130a extends vertically upward, and then gangplank 110 is pivoted to a vertical position in which a hook shaped portion 116a of gangplank handle 116 abuts against washer 131 and the underside of bar 130. Latch bar arm 130a is then rotated clockwise downwardly, the resilience of arm 130a and of the upright portion of handle 116 allowing the angled arm 130a to be cammed thereover and then serving to bias arm 130a in a downwardly extending unstrained position wherein handle 116 is locked between washer 131 and arm 130a.

The latch bar 130 provided for gangplank 110 of bottom deck 26 is journalled at a fixed elevation on column 32 by a pair of U-straps welded to the inner sides of the respective flanges 46 of the column (FIG. 7). Another washer 133 is welded to latch bar 130 intermediate the column side sections 44 which, together with washer 132, limits axial movement of the latch bar.

In order to permit vertical adjustment of the latch bar 130 provided for gangplank 110 of middle deck 28, a clamp structure is provided (FIG. 5A) which comprises a plate 134 bent along vertical bending lines into an S-shape to conform to column 32. One vertical edge of plate 134 has a reversely bent lip portion 134a which grips the vertical edge of the column flange 46 facing the gangplank, while the other vertical edge 134b of plate 134 is bent at an acute angle to the opposite side section 44 of the column so as to dig into the surface thereof. A pair of vertically spaced horizontal screws 135 having conically recessed forward ends are threadably received in nuts 136 which are welded to the central lateral portion of plate 134 in co-axial alignment with suitable screw holes therein. A lock nut 137 is threadably received on each screw 135 which is screwed against plate 134 to lock screw 135 against rotation. When screws 135 are threaded towards the gangplank side of column 32, the angled edge 134b of the plate is forced into one column side 44 while the forward ends of the screws bite into the other column side 44, thereby securely clamping plate 134 to the column. The longitudinal portion of plate 134 adjacent column flange 46 has a U-strap 137 welded thereto in which latch bar 130 is journalled for rotation about a horizontal axis.

The latch bar 130 provided for the gangplank 110 of top deck 30 is similarly journalled on the upper end of a U-section channel post 138 (FIG. 5) which is telescopically mounted within the top of column 32 at the gangplank corner of the superstructure. A latch structure (FIG. 7) comprising a T-bar 139a journalled for vertical axial movement in a U-strap 139b is provided for engaging between a lug 139c in post 138 and the upper edge of deck side flange 64 to hold post 138 in the raised position thereof. To release this latch, post 138 is raised and T-bar 139a rotated 90° so that it is free of lug 139c.

Each gangplank 110 has a suitable length of flexible chain 139 (FIG. 8) connected at the respective ends thereof to gangplank flange 114 and to column 32 (or to clamp plate 134 or post 138 in the case of the gangplanks for the middle and top decks). Chains 139 are used in raising and lowering the gangplanks and also serve as safety chains to prevent the gangplanks from pivoting downward more than a few degrees below the horizontal bridging position thereof. Sufficient slack exists in the chain in the horizontal position of the gangplank to insure adequate lateral clearance for passage of vehicles past the chains.

The double jointed hinging of gangplanks 110 is utilized to advantage when the bumper of an automotive vehicle is in a position close to or overhanging the edge of the deck. A bumper so located interferes with the swinging movement of gangplanks 110 when pivoted about the axis of shaft 118 with link 120 in the extended position of FIG. 5. When this situation occurs it is a simple matter to swing the bottom edge of the gangplank inboard of deck 30 so that link 120 lies flush against deck 30 in the dotted position illustrated in FIGS. 8 and 9. When so retracted, the gangplank clears the bumper or other obstruction as it is pivotably raised or lowered, and when once past the obstruction it may be shifted outboard of the deck by pivoting link 120 to the outwardly extending horizontal position thereof.

In accordance with a further feature of the invention, an improved hand rail assembly 140 is provided for safeguarding personnel using the top deck 30 during vehicle loading and unloading operations. The details of the hand rail structure are shown in FIGS. 10–14. The horizontal railing of the assembly comprises a plurality of pieces 142 of standard ¾ inch diameter pipe, one end of each pipe being flattened into an axially offset flange portion 144 (FIGS. 12 and 13) having a bolt hole in the center thereof. Each pipe 142 is cut to the correct length to extend about one foot more than the distance between a pair of longitudinally adjacent vertical columns 32. Since each of the above described superstructure sections 22, 24 has six vertical columns 32 along each side of each section, five hand rail pipes 142 are required to span the length of each side of the superstructure sections.

Figures 10, 11, 12, 13, 14:
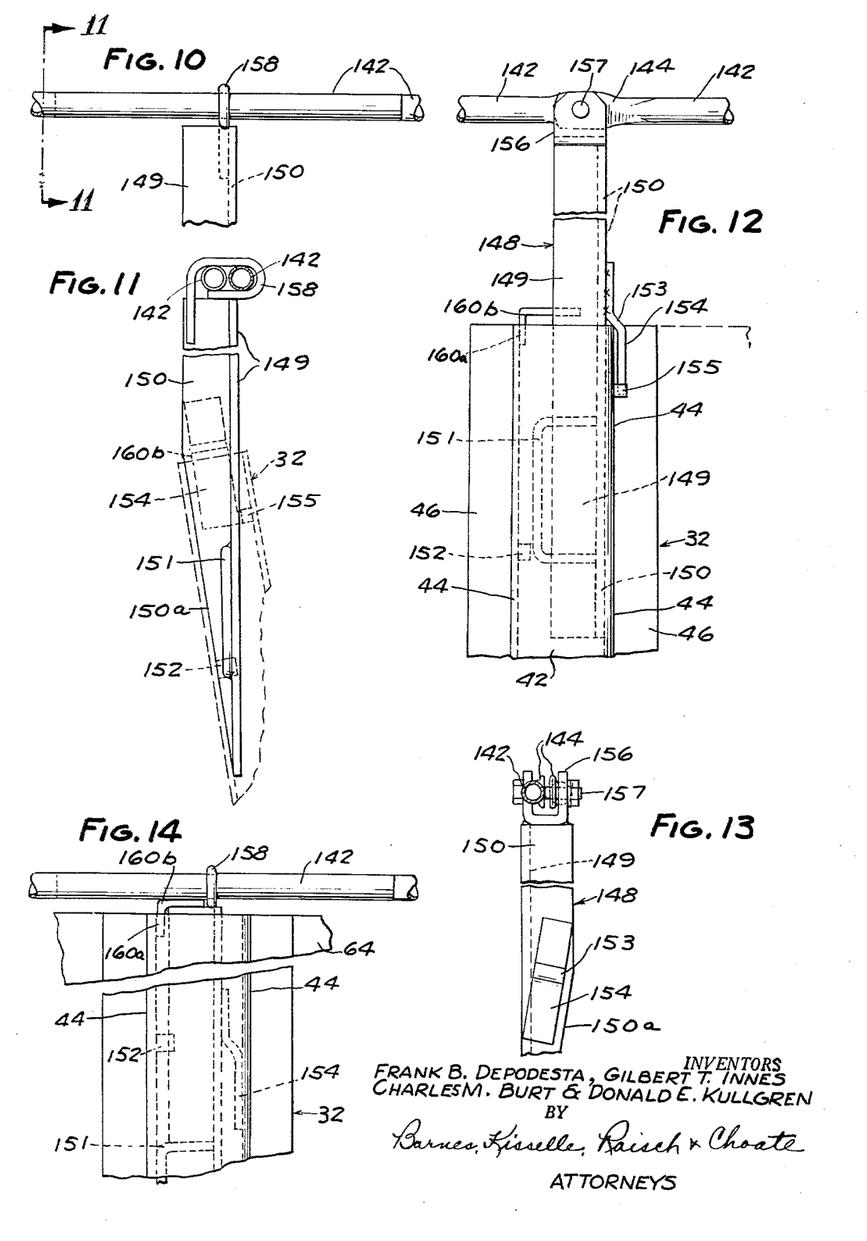
FIG. 10 is an enlarged fragmentary elevational view illustrating a portion of a hand rail and stanchion therefor.
FIG. 11 is an end cross-sectional view taken on the line 11—11 of FIG. 10.
FIG. 12 is a fragmentary side elevational view of a hand rail coupling and stanchion therefor illustrating the raised position thereof on the top of a vertical column.
FIG. 13 is a fragmentary elevational view of the stanchion of FIG. 12 looking lengthwise of the car.
FIG. 14 is a fragmentary side elevational view of the hand rail and stanchion of FIG. 10 illustrating the lowered position thereof in a vertical column.

The hand rail pipes 142 are supported by a plurality of stanchions 148, one of which is supported on the upper end of each vertical column 32, except for the stanchion 148 located at the gangplank corner of top deck 30. A U-section channel bracket 32a is attached to corner column 32 to telescopically receive this stanchion since the corner column is utilized for gangplank latch post 138. Stanchions 148 preferably comprise a right angle iron having flanges 149 and 150 dimensioned so that the stanchion is telescopically receivable within the confines of the center and side sections 42 and 44 of the hat section columns 32 (FIG. 12). The lower portion of lateral flange 150 is diagonally cut to provide a tapering edge 150a so that stanchion 148 may be tilted outboard in the raised position thereof at an incline to the vertical plane of deck sides 64 until tapering edge 150a abuts against the outer surface of longitudinal gusset 66. A vertical guide member 151, comprising a piece of round bar stock bent into a U-shape, is welded against the inner surface of flange 149. A square lug 152 is welded to the inner surface of column side 44 adjacent guide 151 in the raised, tilted position of stanchion 148 so that it is slidably receivable between the opposite side 44 and lug 152 with a close fit, thereby holding lateral stanchion flange 150 against column 32 to prevent the stanchion from rattling, turning or pivoting in a longitudinal plane in the column.

A supporting clip 153 is welded to the outer side of lateral stanchion flange 150 parallel to tapering edge 150a and positioned approximately ⅓ of the distance up from the bottom of the stanchion. Clip 153 is bent outwardly to provide a vertical arm 154 extending dependent therefrom parallel to and spaced from the outer face of lateral flange 150 so as to slidably receive the adjacent side 44 of column 32 therebetween. Another lug 155 is welded to the outer surface of column side 44 which slidably abuts the outer vertical edge of clip arm 154 at the bottom thereof in the outwardly tilted, raised position of the stanchion. The shoulder of clip 153 rests squarely on the top edge of column side flange 44 in this position of the stanchion and carries the weight of stanchion 148 and the hand rails 142 supported thereon, while clip arm 154 when received between column rim 46 and lug 155 holds the upper portion of the stanchion in the outwardly inclined position against lateral as well as longitudinal shifting.

A right angle bracket is provided at the top of column 32 having a vertical flange 160a welded to the inner surface of column side 44 with a horizontal flange 160b extending therefrom to partially enclose the top of the column center section. The horizontal flange 160b serves as a stop against which the upper arm of guide 151 abuts when the stanchion is raised to the point where the bottom end of clip arm 154 just clears the top of lug 155. Those side edges of the horizontal flange 160b adjacent stanchion flanges 149, 150 help guide the stanchion when it is being raised or lowered and also prevent longitudinal and lateral shifting of the top of the stanchion in the lowered position thereof (FIG. 14).

In order to couple hand rail pipes 142 to the upper ends of stanchions 148 two forms of brackets are provided; a U-shaped pivot bracket 156 (FIGS. 12 and 13), and a P-shaped bracket 158 (FIGS. 10–12). U-bracket 156 is welded to the top of stanchion 148 and has a pair of axially aligned holes in the vertical arms thereof for receiving a headed bolt 157 therethrough which pivotably connects the flattened ends 144 of a pair of hand rail pipes 142 to bracket 156. The P-shaped bracket 158 is affixed to the stanchion in an upright position with the plane of the bracket loop at right angles to the axis of the railing, the lower arm of the loop being welded to the upper edge of stanchion 148. The loop of P-bracket 158 is shaped to loosely receive the unflattened ends of two hand rail pipes 142 in overlapping, side-by-side relation (FIG. 11). For one side of sections 22 and 24 considered together, five of stanchions 148 are equipped with P-brackets 158 and the other six stanchions 148 are equipped with U-brackets 156 to provide the eleven stanchions. These stanchions are alternated, beginning with a U-bracket stanchion at the outer ends of sections 22, 24, so that every other stanchion therebetween has a U-bracket 156 on the top thereof with two hand rail pipes 142 pivotally coupled thereto (FIG. 12) and extending oppositely therefrom into and slightly beyond the P-brackets on the stanchions on either side thereof (FIG. 11). The pair of end columns 32 of section 24 located adjacent the gap 23 between sections 22 and 24 need not carry stanchions, in which case an extra length hand rail pipe 140a is used to span the extra distance between the P-bracket stanchion at the end of section 22 and the U-bracket stanchion at the second column from gap 23 in section 24, as shown in FIG. 1.

The above described hand rail assembly 140 provides a strong and low cost structure. In addition, it may be manually lifted to the outwardly inclined raised position shown in FIGS. 1, 5 and 12 or lowered to the down position shown in FIG. 14 by one person, if necessary. This is accomplished, for example, by beginning with the stanchion 148 at one end of the deck and vertically lifting the same in the inclined posture thereof until clip arm 154 clears the top of lug 155, and then pivoting stanchion 148 inboard in a lateral plane to a vertical position, thereby moving guide 151 outwardly within column 32 so that it is clear of lug 152 therein. Stanchion 148 is then lifted vertically until the upper arm of guide 151 hits stop flange 160b. In this position the bottom end of clip arm 154 clears the top of the column, permitting the stanchion to be shifted longitudinally so that clip arm 154 is positioned for insertion within the column. The stanchion is then lowered vertically until U-bracket 156 rests on stop flange 160b. The stanchion is raised by reversing the above sequence.

In the lowered position, clip arm 154 and guide 151 cooperate with flange 160b to hold the stanchion against longitudinal shifting (FIG. 14). Due to the pivotable connection of the flattened ends 144 of hand rail pipes 142 to U-bracket 156 it is possible to telescope the stanchions one at a time, the overlapping ends of hand rail pipes 142 sliding in P-brackets 158 as longitudinally adjacent stanchions are moved vertically relative to one another. The length of pipes 142 is sufficient to prevent the pipes from coming out of P-brackets 158 when the pipes are in a diagonal position between longitudinally adjacent stanchions. Hence, successive stanchions may be lowered or raised one at a time as the person progresses along the deck.

We claim:

1. In combination, a railroad car, a superstructure adapted to be carried on said railroad car and having a deck extending longitudinally of said railroad car, a hand rail assembly including first and second upwardly extending stanchions spaced apart along a side of said deck, support means adjacent said side of said deck and adapted to adjustably support each stanchion in raised and lowered positions relative to said deck, and a hand rail extending between said stanchions, said hand rail being pivotably coupled at one end thereof to said first stanchion and being slidably coupled near the other end thereof to said second stanchion for supporting said hand rail therebetween whereby either one of said stanchions may be raised and lowered independently of the other stanchion with the hand rail continuously supported on said stanchions by said hand rail pivoting on said first stanchion and sliding while pivoting on said second stanchion.

2. The combination recited in claim 1 wherein said support means comprises a plurality of vertical deck supporting hat section columns connected to said deck with the center section thereof spaced outwardly of the side of the deck, the upper ends of the columns being open and positioned adjacent said deck, each of said stanchions being telescopically receivable within the center section of one of said columns for support therein in the raised and lowered positions thereof.

3. In combination, a railroad car, a superstructure adapted to be carried on said railroad car and having a deck extending longitudinally of said railroad car, a hand rail assembly including upwardly extending stanchions spaced apart along a side of said deck, support means adjacent said side of said deck and being adapted to telescopically receive and adjustably support each of said stanchions in raised and lowered positions relative to said deck, and a plurality of hand rails each of sufficient length to extend a predetermined distance beyond adjacent stanchions when disposed therebetween parallel to the side of said deck, one of said hand rails being pivotably coupled at one end thereof to a first one of said stanchions, a second one of said stanchions located longitudinally adjacent said first stanchion having a loop bracket supported thereon adapted to slidably receive two of said hand rails therethrough in side-by-side relation for independent pivotal movement therein, said one hand rail being so received near the other end thereof in said loop bracket, another of said hand rails also being so received in said loop bracket near one end thereof in side-by-side overlapping relation with the other end of said one hand rail and being pivotably coupled at the other end thereof to a third one of said stanchions located longitudinally adjacent said second stanchion on the opposite side thereof from said first stanchion whereby said hand rail assembly may be raised and lowered by vertically telescoping each of said stanchions one at a time on said support means with each of said hand rails being continuously supported by simultaneously sliding said predetermined distance and pivoting in said loop bracket.

4. In combination, a railroad flat car and a multi-level superstructure for carrying vehicles in stacked relation above the floor of the railroad flat car, said superstructure comprising a plurality of vertical columns spaced longitudinally apart in a row along each side of the railroad car, support means for vertically supporting the bottom of each of said columns on the floor of said flat car, a plurality of horizontal one-piece sheet metal decks extending longitudinally of said railroad car and being upwardly arched laterally thereof between said longitudinal rows of columns, each of said decks having upwardly bent integral side flanges extending longitudinally thereof along the sides of said decks and being laterally spaced apart to provide outer curbing for vehicles driven longitudinally on said decks, a first one of said decks being fixedly supported at said sides thereof from each of said columns at an elevation spaced closely adjacent the floor of said flat car, a second one of aid decks being spaced vertically above said first deck and extending parallel thereto, bracing means secured to the sides of said second deck adjacent each of said columns for detachable connection of said second deck to said columns, thereby permitting vertical adjustment of the second deck relative to said first deck to provide vertical clearance for receiving various types of vehicles therebetween, said bracing means providing vertical support for said arched second deck solely near the side edges thereof to maximize said vertical vehicle clearance while minimizing the overall height of the multi-level superstructure, said bracing means for securing said second deck to one of said columns including longitudinal gusset means comprising a flat, vertically disposed plate having a horizontal upper edge extending beyond the vertical side edges of said columns and being joined to the undersurface of said deck at the junction of said side flanges thereof with the arched bottom portion thereof, said plate having side edges converging respectively from the opposite ends of said upper edge thereof in a downward direction toward said column, and lateral gusset means including a pair of triangular arms extending laterally inward from said longitudinal gusset, the upper edges of said arms being shaped to conform to the unstrained arched configuration of said deck and being joined to the undersurface thereof, the lower edges of said arms being inclined so as to extend from a point approximately beneath the position of wheels of vehicles received on said deck downwardly to a lower portion of said longitudinal gusset, said gusset means thereby reinforcing said second deck while supporting the same on said columns so that said second deck provides the primary interconnecting bracing structure for tying said columns together.

5. The combination recited in claim 4 wherein said longitudinal and lateral gusset means are both formed from identical flat trapezoidal plates, the longitudinal gusset trapezoidal plate being welded along the longer base edge thereof to the undersurface of said deck flush with the side flanges thereof and extending downwardly therefrom in a vertical plane, said lateral gusset trapezoidal plate being bent to provide said pair of triangular arms which extend from the outer edges of the center section thereof, the bending lines of said arms diverging upwardly so that the upper edges of said arms slope upwardly to conform with the arched undersurface of said deck, said lateral gusset plate also being welded along the longer base edge thereof to the undersurface of the deck with the center section thereof positioned against the inner face of said longitudinal gusset plate, said gusset plates each being provided with a plurality of holes in the adjacent portions thereof which register with one another for receiving fastening means adapted to connect both of said gusset plates to said vertical column.

6. The combination recited in claim 5 wherein each of said vertical columns comprises a one-piece column formed from flat sheet metal into a hat section column having a center section spaced outwardly of and parallel to said longitudinal gusset plate, a pair of longitudinally spaced apart and parallel side sections extending integrally from the vertical edges of said center section perpendicularly towards said longitudinal gusset plate and a pair of coplanar rim sections extending away from one another integrally from the vertical edges of said side sections of the column and adjacent the outer face of said longitudinal gusset plate, said column rim sections having a plurality of vertically spaced holes aligned for registry with said plurality of holes in said gusset plates for receiving the fastening means to connect said gusset plates to said column, whereby laterally opposite pairs of said hat section columns help maintain the longitudinal portions of said gusset plates fastened respectively thereto in vertically parallel alignment with one another to thereby help maintain the arched configuration of said sheet metal decks.

7. In combination, a railroad car, a superstructure adapted to be carried on said railroad car and having a deck extending longitudinally of said railroad car, a hand rail assembly including first and second upwardly extending stanchions spaced apart along a side of said deck, support means adjacent said side of said deck and adapted to adjustably support each stanchion in raised and lowered positions relative to said deck, and a hand rail extending between said stanchions, said hand rail being pivotably coupled at one end thereof to said first stanchion and being slidably coupled near the other end thereof to said second stanchion for supporting said hand rail therebetween whereby either one of said stanchions may be raised and lowered independently of the other stanchion with the hand rail continuously supported on said stanchions by said hand rail pivoting on said first stanchion and sliding while pivoting on said second stanchion, said hand rail comprising a length of pipe with said one end being flattened and having a hole therethrough, and wherein said first stanchion has a U-shaped bracket secured to the upper end thereof having a hole in each vertical arm thereof, a pivot pin received through said U-bracket holes and said hole in said flattened pipe end for pivotably supporting the same within said U-bracket, and wherein said second stanchion has a P-shaped bracket secured to the upper end thereof with the loop of the P-bracket clear thereof for slidably receiving therethrough and supporting said other end of said pipe for pivotal movement therein.

8. In combination, a railroad car, a superstructure adapted to be carried on said railroad car and having a deck extending longitudinally of said railroad car, a hand rail assembly including first and second upwardly extending stanchions spaced apart along a side of said deck, support means adjacent said side of said deck and adapted to adjustably support each stanchion in raised and lowered positions relative to said deck, and a hand rail extending between said stanchions, said hand rail being pivotably coupled at one end thereof to said first stanchion and being slidably coupled near the other end thereof to said second stanchion for supporting said hand rail therebetween whereby either one of said stanchions may be raised and lowered independently of the other stanchion with the hand rail continuously supported on said stanchions by said hand rail pivoting on said first stanchion and sliding while pivoting on said second stanchion, said support means comprising a plurality of vertical deck supporting hat section columns connected to said deck with the center section thereof spaced outwardly of the side of the deck, the upper ends of the columns being open and positioned adjacent said deck, each of said stanchions being telescopically receivable within the center section of one of said columns for support therein in the raised and lowered positions thereof, each of said stanchions comprising an angle iron having a lateral flange and a longitudinal flange positioned respectively parallel to a lateral side flange and to the longitudinal center section of said hat section column, said lateral flange of said angle iron having bracket means secured thereto including a downwardly extending arm spaced from and parallel with that face of said lateral angle iron flange which is adjacent said lateral side flange of said column for receiving the latter flange therebetween to support said angle iron in a raised position on said column, said longitudinal flange of said angle arm including guide means projecting longitudinally from the vertical edge thereof spaced from said lateral flange of the angle arm, said guide means and said arm of said bracket means being spaced apart longitudinally of said angle iron so as to be slidably receivable with a close fit between the opposite lateral side flanges of said column for preventing longitudinal shifting of said angle iron when it is telescopically received within said column in the lowered position thereof.

9. The combination recited in claim 8 wherein said vertical edge of said lateral flange of said angle iron which is spaced from said longitudinal flange thereof is tapered so as to converge therewith at the bottom of the angle iron so that the portion of said angle iron received within said column in the raised position of the angle iron is pivotable therein for moving said angle iron between vertical and outwardly inclined positions, and which further includes stop means affixed to the outside of said column and positioned to engage said arm of said bracket means to thereby prevent pivotable movement of said angle iron in a lateral plane when it is in a raised, outwardly inclined position with said bracket means resting on said column, said column having projection means extending from the inner surface of the lateral side thereof and positioned for slidably abutting said guide means of said angle iron in the raised, outwardly inclined position of said angle iron to thereby prevent longitudinal shifting of the lower portion of said angle iron within said column, said guide means being disengageable from said projection means by lifting said angle iron until said arm clears said stop means and then pivoting the upper end of said angle iron inboard of said deck, thereby permitting longitudinal shifting of said stanchion relative to said column for bringing said arm of said bracket means into position for telescopic insertion with said angle iron into the center section of said column.

References Cited by the Examiner

UNITED STATES PATENTS

| | | | |
|---|---|---|---|
| 833,976 | 10/1906 | Sage | 105—389 |
| 951,518 | 3/1910 | Welch et al. | 105—458 |
| 1,693,193 | 11/1928 | Duryea | 105—454 |
| 1,750,128 | 3/1930 | Romine | 105—368 |
| 1,750,129 | 3/1930 | Romine | 105—368 |
| 1,969,844 | 8/1934 | Heath | 105—454 |
| 2,047,955 | 7/1936 | Fitch | 105—392.5 |
| 2,128,667 | 8/1938 | Atherton | 105—368 |
| 2,155,533 | 4/1939 | Dwyer | 105—454 |
| 2,521,088 | 9/1950 | Phelps | 206—46 |
| 2,561,927 | 7/1951 | Janeczko | 105—370 |
| 2,690,141 | 9/1954 | King | 105—368 |
| 2,728,305 | 12/1955 | Candlin | 105—454 |
| 2,788,751 | 4/1957 | Russell | 105—458 |
| 2,828,023 | 3/1958 | Berra et al. | 211—13 |
| 2,873,693 | 2/1959 | Chapman et al. | 105—368 |
| 2,906,405 | 9/1959 | Erickson | 211—13 |
| 2,954,197 | 9/1960 | Laird | 248—119 |
| 3,003,436 | 10/1961 | Peterson | 105—454 |
| 3,159,113 | 12/1964 | Schultz | 105—454 |

OTHER REFERENCES

"Frisco Tri-Level Auto Car," disclosed on page 23 of the Feb. 15, 1960 issue of Railway Age.

ARTHUR L. LA POINT, *Primary Examiner.*

LEO QUACKENBUSH, EUGENE G. BOTZ,
*Examiners.*